Patented Jan. 14, 1941

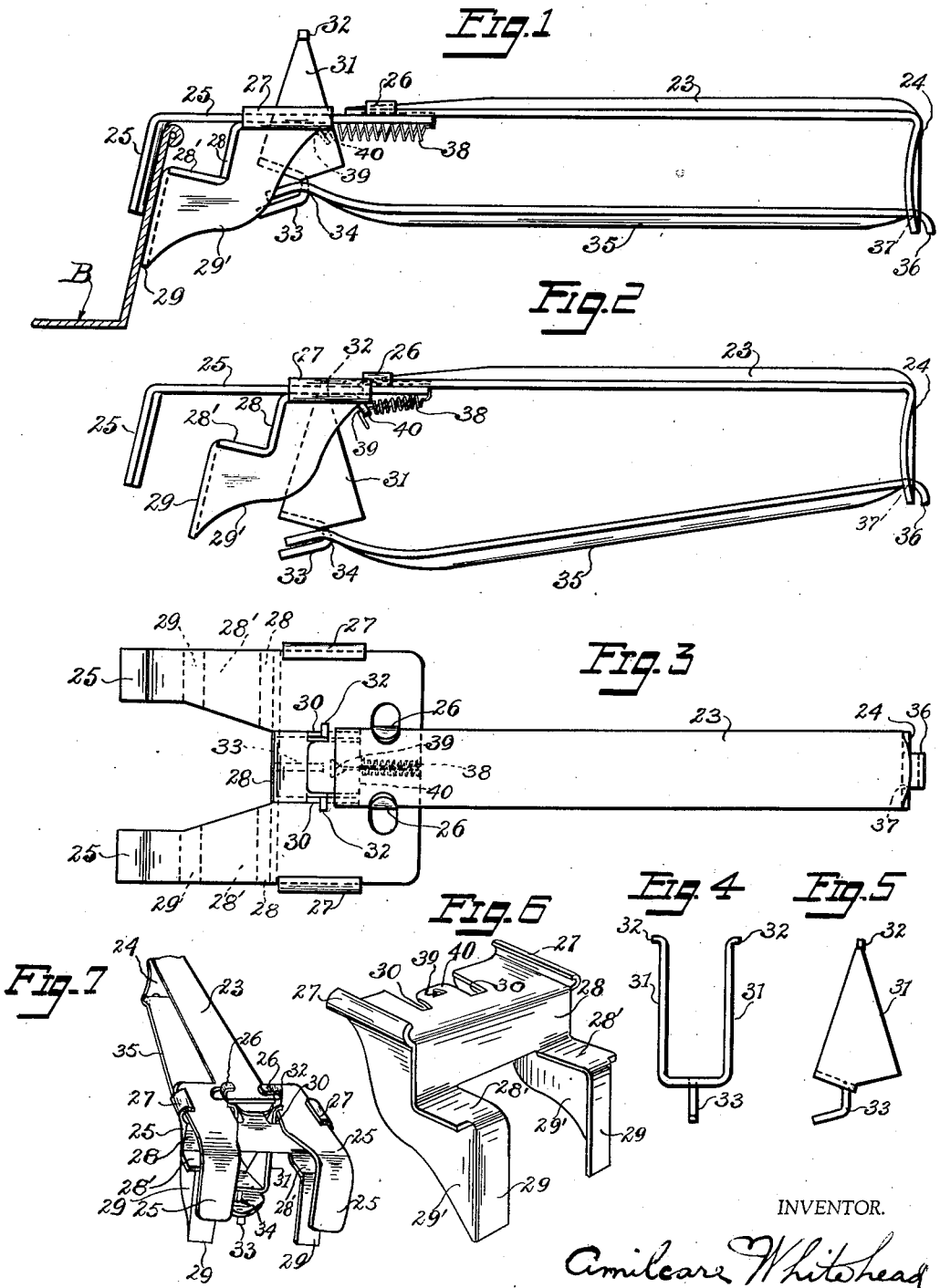

2,228,547

UNITED STATES PATENT OFFICE 2,228,547

VESSEL LIFTER

Amilcare Whitehead, Brooklyn, N. Y.

Application March 26, 1938, Serial No. 198,275

1 Claim. (Cl. 294—34)

My invention relates to improvements in a vessel lifter which when applied will act as a temporary handle to lift hot pie pans, frying pans, aluminum-ware, etc., either on the stove or in the oven without burning the hand.

A further object is to provide an improved vessel lifter which is operated by the grip of the hand upon the handle and upon a wedge to cause a movable jaw to move toward the fixed jaw and tightly grip a vessel.

A further object is to provide a vessel lifter of simple, inexpensive construction, strong and durable in use yet practical enough to lift a fragile glass without damage.

With these and other objects in view, the invention consists in certain novel features of construction in combinations and arrangements of parts as will be more fully hereinafter described and pointed out in the claim.

Fig. 1 is a side view of my device with the jaws in gripping position.

Fig. 2 is a similar view with the jaws open.

Fig. 3 is a plan view.

Figs. 4, 5 and 6 are detail views and Fig. 7 is a perspective view.

One form of the invention is illustrated in the accompaning drawing in which Fig. 1 is a side view of handle when it is applied to vessel as illustrated by letter B with both handles 23 and 35 closed and actuating cam 31 which in turn moves the movable double jaw 29—29 forward or to a closed position on vessel illustrated by letter b. 38 illustrates the spirally coiled spring which pulls the movable double jaw 29—29 back when the handles 23 and 35 are released.

Fig. 2 is a side view of the handle showing when the device is in a released position, with the cam 31 drawn down and the movable double jaw 29—29 drawn back thus illustrating the handle in readiness for use. Handle 23 is bent into an L shape, that part of which is illustrated by 24, 37 is a perforation in 24 which allows a tongue 36 from handle 35 to pass through, and acting as hinge for handles 23 and 35.

Fig. 3 is a top view showing the handle in two parts, the handle 23 and the upper stationary double jaw 25—25. 26—26 illustrates two tongues cut from the upper stationary double jaw 25—25 and bent over handle 23 to form an inseparable unit. 32—32 illustrates two stops bent from cam 31. 27—27 illustrates the two tongues bent from the movable double jaw 29—29 over the upper stationary double jaw 25—25 thus connecting the movable double jaw 29—29 to the upper stationary double jaw 25—25 and also acting as slides.

Fig. 4 is a front view of cam 31—31 showing the double wedge cam bent over to form a U shape. 32—32 are the two stops. 33 is a tongue cut from cam 31 which connects cam to handle 35 by passing through a perforation 34 in handle 35 as illustrated in Fig. 2.

Fig. 5 is a side view of cam 31, 32 the stops and 33 the tongue.

Fig. 6 is an augular front view of the movable double jaw 29—29. 27—27 are the two tongues bent from the movable double jaw 29 over the stationary double jaw 25 connecting both jaws 25 and 29 and also acting as slides. 28—28 are the steps which clear the rolled or protruding edges on vessels as illustrated in Fig. 1. 30—30 are the two recesses to guide the cam 31 as it slides. 40 is a tongue for the spiral spring 38 and 39 is a hole to insert one end of the spiral spring.

Fig. 7 is a perspective view of the device, the other end of which connects to handle 25.

What I claim as new and desire to secure by Letters Patent is:

A vessel lifter consisting of a sheet metal quarter rounded upper handle portion and bifurcated jaw portion connected by tongues stamped from said bifurcated jaw portion and clamped over said upper handle portion, said jaw portion having two fixed jaws at one end, a lower handle hinged at the other end of said upper handle portion, a movable jaw slidably mounted on said bifurcated jaw portion, a cam mounted between the fixed bifurcated jaw and said lower handle to operate against said movable jaw and a spring attached to said movable jaw tending to draw same away from the fixed jaws when the movable double jaw is not actuated by said cam.

AMILCARE WHITEHEAD.